United States Patent
Fujita et al.

(10) Patent No.: US 7,369,359 B2
(45) Date of Patent: May 6, 2008

(54) THIN FILM MAGNETIC HEAD HAVING SECTIONAL SHAPE OF WRITE MAGNETIC POLE FORMED AS A TRAPEZOID

(75) Inventors: Mutsumi Fujita, Kawasaki (JP); Takashi Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 420 days.

(21) Appl. No.: 10/953,307

(22) Filed: Sep. 29, 2004

(65) Prior Publication Data

US 2005/0041338 A1    Feb. 24, 2005

(51) Int. Cl.
   *G11B 5/147*    (2006.01)
(52) U.S. Cl. .................................................. 360/126
(58) Field of Classification Search ............... 360/126
   See application file for complete search history.

(56) References Cited

U.S. PATENT DOCUMENTS 5,966,277 A * 10/1999 Koshikawa et al. ........ 360/126
6,477,006 B1 * 11/2002 Sato ............................ 360/126

FOREIGN PATENT DOCUMENTS

| JP | 60-035315 | 2/1985 |
|---|---|---|
| JP | 04-157607 | 5/1992 |
| JP | 06-124415 | 5/1994 |
| JP | 06-349026 | 12/1994 |
| JP | 11-007608 | 1/1999 |
| JP | 11-353618 | 12/1999 |
| JP | 2000215411 | 8/2000 |
| JP | 2001176023 | 6/2001 |
| JP | 2002074611 | 3/2002 |

* cited by examiner

*Primary Examiner*—A. J. Heinz
(74) *Attorney, Agent, or Firm*—Greer, Burns & Crain, Ltd.

(57) ABSTRACT

A thin film magnetic head having a high write-in accuracy can be produced by suppressing a magnetic field leak between upper and lower magnetic poles. The method of producing the thin film magnetic head, in which a head substrate, magnetoresistance effect element, lower magnetic pole, write gap layer and an upper magnetic pole are formed in this order, has the lower magnetic pole patterned with a larger width than that of the upper magnetic pole in a write magnetic pole after the lower magnetic pole is formed. An insulation layer is formed in the same layer as the lower magnetic pole such that the insulation layer is flattened with the lower magnetic pole. The upper magnetic pole is formed on a surface of the write gap layer after the write gap layer is formed, and a protrusion of the lower magnetic pole is removed from a side face thereof.

2 Claims, 3 Drawing Sheets

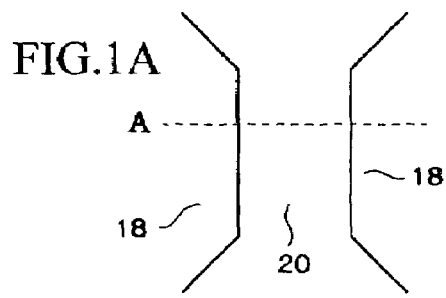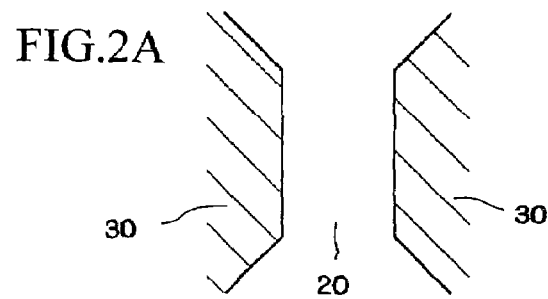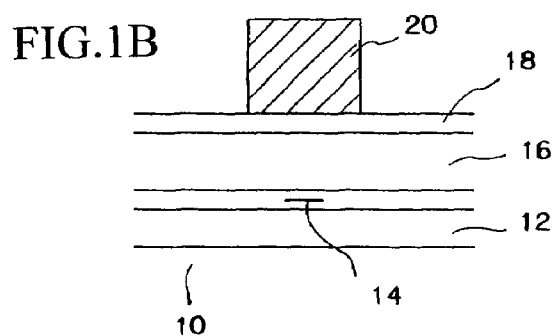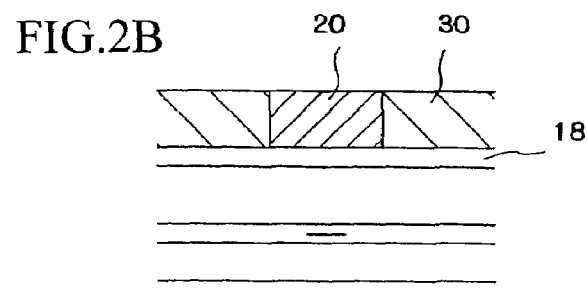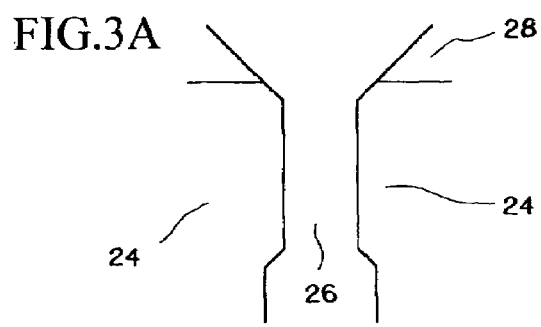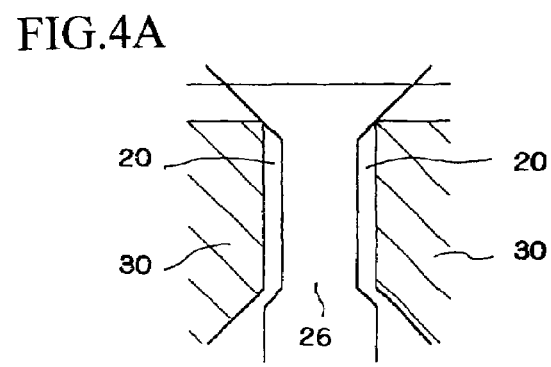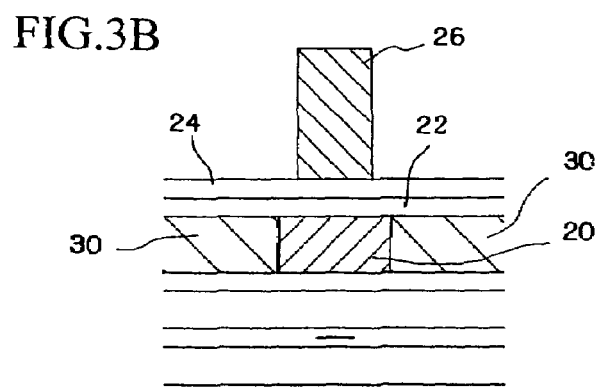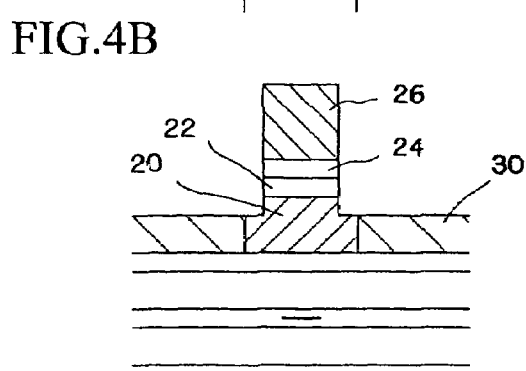

THIN FILM MAGNETIC HEAD HAVING SECTIONAL SHAPE OF WRITE MAGNETIC POLE FORMED AS A TRAPEZOID

FIELD OF TECHNOLOGY

The present invention relates to a thin film magnetic head and a production method thereof, more precisely relates to a thin film magnetic head whose write magnetic pole has unique constitution and a production method thereof.

BACKGROUND TECHNOLOGY

A conventional method of producing a write magnetic pole of a thin film magnetic head is shown in FIGS. 7-10. FIG. 7 is a sectional view of the thin film magnetic head including an air bearing surface. A symbol 10 stands for a thin film magnetic head substrate composed of AlTiC, and a lower shielding layer 12, a magnetoresistance effect element 14, an upper shielding layer 16, a read/write separation layer 18 and a lower magnetic pole 20 are formed on the substrate 10 in this order.

FIG. 8B is a sectional view of the thin film magnetic head including the air bearing surface wherein an upper magnetic pole 26 is formed on the lower magnetic pole 20. A dotted line "A" indicates a position of the air bearing surface. FIG. 8A is a plan view in which the upper magnetic pole 26 is formed. A part of the upper magnetic pole 26 in the vicinity of the air bearing surface is narrower than other parts so as to make a write width narrow. A write gap layer 24, which is composed of a non-magnetic material, e.g., alumina, is formed between the lower magnetic pole 20 and the upper magnetic pole 26.

After the upper magnetic pole 26 is formed, both sides of a base part of the upper magnetic pole 26 are grooved, by FIB (Focused Ion Beam) trimming, toward the lower magnetic pole 20 as shown in FIGS. 10A and 10B. In FIG. 10A, parts "B" of the lower magnetic pole 20 are grooved by FIB trimming.

The both sides of the upper magnetic pole 26 are FIB-trimmed so as to make the write width narrow to improve a write-in accuracy of a write magnetic pole and so as to suppress a magnetic field leak between the upper magnetic pole 26 and the lower magnetic pole 20. By FIB trimming, the grooves are formed at the sides of the lower magnetic pole 20 and distances between the upper magnetic pole 26 and a residual magnetic material located at the sides of the lower magnetic pole 20 are made longer, so that the magnetic field leak can be suppressed. The magnetic field leak between the upper magnetic pole 26 and the lower magnetic pole 20 affects a recording medium to erase signals recorded therein, so that the write-in accuracy must be lowered. To improve characteristics of the thin film magnetic head, the magnetic field leak between the upper magnetic pole 26 and the lower magnetic pole 20 should be suppressed as much as possible.

However, in the case of employing a high saturation magnetic flux density (HiBs) layer 22 in the write magnetic pole, a magnetic field is easily leaked between the upper magnetic pole 26 and the lower magnetic pole 20. Thus, as shown in FIG. 8B, after the HiBs layer 22 and the gap layer 24 are formed on a surface of the lower magnetic pole 20 and the upper magnetic pole 26 are formed, the HiBs layer 22, which is composed of a magnetic material, is removed by ion milling. FIGS. 10A and 10B show a state in which FIB trimming is executed after the ion milling is executed.

However, if the HiBs layer 22 is removed by ion milling so as to make the lower magnetic pole 20 thinner and make the distances between the upper magnetic pole 26 and the residual magnetic material left at the sides of the lower magnetic pole 20 longer to suppress the magnetic field leak between the upper magnetic pole 26 and the lower magnetic pole 20, the upper magnetic pole 26 is simultaneously ion-milled so that the upper magnetic pole 26 must be thinner and the write-in capacity of the write magnetic pole must be lowered.

To further suppress the magnetic field leak between the upper magnetic pole 26 and the lower magnetic pole 20, increasing an amount of FIB-trimming the lower magnetic pole 10 and widening the grooves have been proposed. However, it takes a long time to FIB-trim wide areas, and positions to be FIB-trimmed must be correctly positioned so that productivity must be remarkably lowered.

The present invention was invented to solve the above described problems, and an object of the present invention is to provide a thin film magnetic head, which is capable of solving the problem of magnetic field leak between an upper magnetic pole and a lower magnetic pole and having a high write-in accuracy, and a suitable production method of the thin film magnetic head.

DISCLOSURE OF THE INVENTION

To achieve the object, the present invention has following structures.

Namely, the thin film magnetic head, whose read head includes a magnetoresistance effect element and whose write magnetic pole includes an inductive head, is characterized by a lower magnetic pole being faced an upper magnetic pole and provided under the same only.

And, the thin film magnetic head is characterized by an insulation layer, which is composed of a non-magnetic material and which is thinner than the lower magnetic pole, being provided on the both sides of the lower magnetic pole.

Further, the thin film magnetic head is characterized by an HiBs layer formed between a write gap layer and the lower magnetic pole.

The method of producing a thin film magnetic head, in which a head substrate, a magnetoresistance effect element, a lower magnetic pole, a write gap layer and an upper magnetic pole are formed in this order, is characterized in that the lower magnetic pole is so patterned as to have a larger width than the width of the upper magnetic pole in a write magnetic pole after the lower magnetic pole is formed, that subsequently an insulation layer composed of a non-magnetic material is formed in the same layer as the lower magnetic pole in such a manner that the insulation layer is flattened together with the lower magnetic pole, that the upper magnetic pole is formed on a surface of the write gap layer after the write gap layer is formed on surfaces of the lower magnetic pole and the insulation layer, and that finally a protrusion of the lower magnetic pole is removed from a side face thereof by FIB trimming.

Further, the method is characterized in that an HiBs layer is formed on the surfaces of the lower magnetic pole and the insulation layer after the insulation layer is formed in the same layer as the lower magnetic pole, that the write gap layer and the HiBs layer exposed on a side face of the upper magnetic pole are removed by ion milling after the write gap layer is formed on a surface of the HiBs layer and the upper magnetic pole is formed, and that finally both sides of the upper magnetic pole and the lower magnetic pole are FIB-trimmed.

BRIEF DESCRIPTION OF THE DRAWINGS

FIGS. 1A and 1B are a plan view and a sectional view of a state, in which a lower magnetic pole of a thin film magnetic head is formed by the production method of the present invention;

FIGS. 2A and 2B are a plan view and a sectional view of a state, in which heights of the lower magnetic pole and an insulation layer are made equal;

FIGS. 3A and 3B are a plan view and a sectional view of a state, in which an upper magnetic pole is formed;

FIGS. 4A and 4B are a plan view and a sectional view showing a step of ion milling;

PREFERRED EMBODIMENTS OF THE INVENTION

Figure 5A:
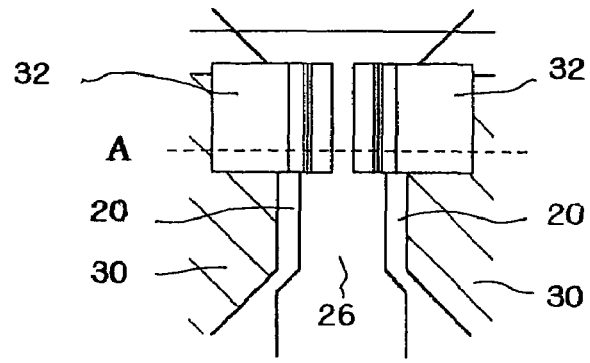
FIGS. 5A and 5B are a plan view and a sectional view showing a step of FIB trimming.

Preferred embodiments of the present invention will now be described in detail with reference to the accompanying drawings. FIGS. 1-5 explain a production method of the thin film magnetic head of the present invention.

As shown in FIGS. 1A and 1B, a lower shielding layer 12, a magnetoresistance effect element 14, an upper shielding layer 16, a read/write separation layer 18 and a lower magnetic pole 20 are formed on a thin film magnetic head substrate 10 in this order. The lower shielding layer 12, the upper shielding layer 16 and the lower magnetic pole 20 are composed of magnetic materials, e.g., NiFe. The read/write separation layer 18 is composed of a non-magnetic material, e.g., alumina.

Figure 7:
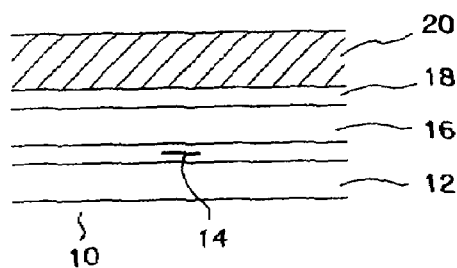
FIG. 7 is a sectional view of the state, in which the lower magnetic pole is formed by the conventional production method of the thin film magnetic head.
Figure 8A:
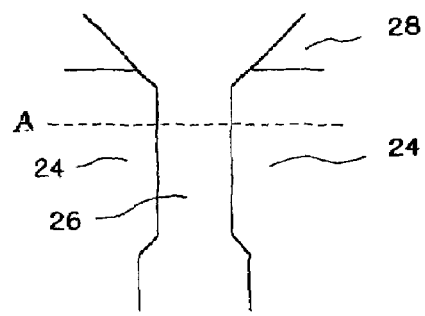
FIGS. 8A and 8B are a plan view and a sectional view of the state, in which the upper magnetic pole is formed.
Figure 8B:
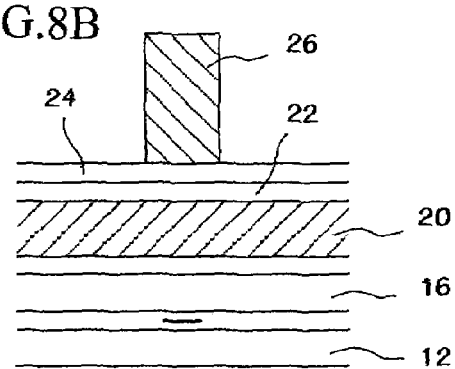

The production step shown in FIGS. 1A and 1B is a unique step of the present embodiment. Namely, the lower shielding layer 12, the magnetoresistance effect element 14, the upper shielding layer 16 and the read/write separation layer 18 are formed on the substrate 10 as well as the conventional method. In the conventional method, the lower magnetic pole 20 is formed on the whole surface of the read/write separation layer 18 as shown in FIG. 7; in the present embodiment, the lower magnetic pole 20 is formed according to a planar shape of a write magnetic pole of an upper magnetic pole 26. A plan view of the lower magnetic pole 20 is shown in FIG. 1A. A dotted line "A" indicates an air bearing surface of a slider.

When the lower magnetic pole 20 is patterned, an actual width of the lower magnetic pole 20 is made slightly wider than a width of the upper magnetic pole 26, and protrusions protruding from side faces of the lower magnetic pole 20 are located within an FIB trimming area for trimming the both side faces of the lower magnetic pole 20.

Patterning the lower magnetic pole 20 will be explained. Firstly, an electric power feeding layer is formed on the surface of the read/write separation layer 18 by sputtering, then a surface of the electric power feeding layer is coated with resist. The resist is exposed and developed to expose a part of the electric power feeding layer, in which the lower magnetic pole 20 will be formed, then the exposed part of the electric power feeding layer is plated and raised by electrolytic plating, so that the lower magnetic pole 20 is formed. Finally, the resist left on the surface of the electric power feeding layer is removed, and the exposed part of the electric power feeding layer is removed by etching, so that the lower magnetic pole 20 having a prescribed pattern is formed on the surface of the read/write separation layer 18.

In FIGS. 2A and 2B, the surface of the read/write separation layer 18 is coated with the lower magnetic pole 20 and insulation layers 30 composed of a non-magnetic material. In the present embodiment, after the lower magnetic pole 20 is formed on the surface of the read/write separation layer 18, the surface of the read/write separation layer 18 including the lower magnetic pole 20 is coated with alumina by sputtering, then the alumina layer and a top part of the lower magnetic pole 20 are ground so as to make heights of the lower magnetic pole 20 and the alumina insulation layers 30 equal and make flatten their surfaces. When the surfaces are ground, the top part of the lower magnetic pole 20 is ground; therefore, thickness of the lower magnetic layer 20 should be designed with considering the amount of grinding the top part when the lower magnetic pole 20 is formed on the surface of the read/write separation layer 18.

In FIG. 2A, the lower magnetic pole 20 and the alumina insulation layers 30, which are formed on the both sides of the lower magnetic pole, are formed by the grind treatment.

In FIGS. 3A and 3B, an HiBs layer 22 is formed on the lower magnetic pole 20 and the insulation layers 30, further a write gap layer 24, which is composed of a non-magnetic material, is formed thereon, then the upper magnetic pole 26 is formed. The HiBs layer 22 has great saturation magnetization so as to improve write-in accuracy of the write magnetic pole.

The upper magnetic pole 26 is composed of a magnetic material, e.g., NiFe. The upper magnetic pole 26 may be patterned by the same manner for patterning the lower magnetic pole 20.

In FIG. 3B, the width of the lower magnetic pole 20 is wider than that of the upper magnetic pole 26, the side faces of the lower magnetic pole 20 are protruded outward with respect to the side faces of the upper magnetic pole 26.

Figure 9A:
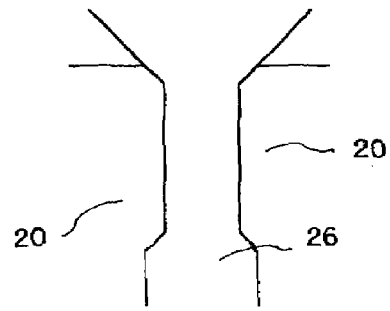
FIGS. 9A and 9B are a plan view and a sectional view showing the step of ion milling.
Figure 9B:
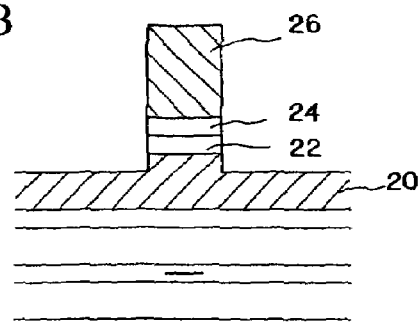

In FIGS. 4A and 4B, parts of the write gap layer 24 and the HiBs layer 22, which are extended sideward from the upper magnetic pole 26, are removed by ion mill trimming. An object of the ion mill trimming is to remove the write gap layer 24 and the HiBs layer 22, so the lower magnetic pole 20 and the insulation layers 30 may be slightly trimmed until they are exposed. The ion mill trimming is capable of uniformly trimming a whole surface of a work piece. Therefore, the upper magnetic pole 26 is also trimmed and made slightly thinner by the ion mill trimming. In the present embodiment, only the write gap layer 24 and the HiBs layer 22 are removed, so amount of trimming the upper magnetic pole 26 is much less than the conventional method (see FIG. 9).

In the present embodiment, the parts of the write gap layer 24 and the HiBs layer 22, which are extended sideward from the upper magnetic pole 26, are removed by ion mill trimming, but the step of removing the HiBs layer 22 may be omitted. Note that, if the HiBs layer 22 is removed, no disused members are left in the vicinity of the write magnetic pole.

Figure 5B:
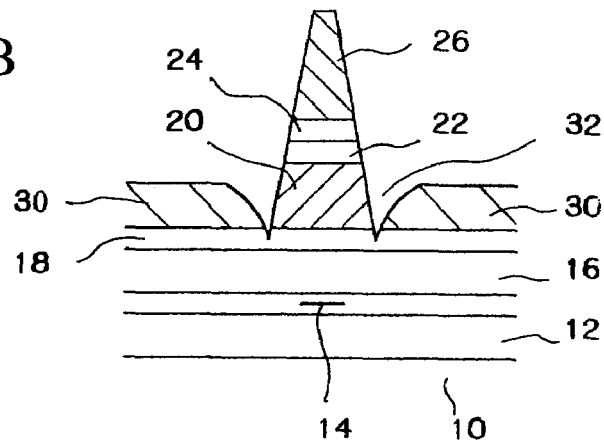

In FIGS. 5A and 5B, the both side faces of the upper magnetic pole 26 and the both side faces of the lower magnetic pole 20 are trimmed by FIB (Focused Ion Beam)

trimming, so that the write magnetic pole (a part of the magnetic pole in the vicinity of the air bearing surface) has a prescribed write width. The FIB trimming is capable of focusing a part to be trimmed. In the present embodiment, the both side faces of the upper magnetic pole 26 are trimmed, further the protrusions protruding from the side faces of the lower magnetic pole 20 are concentratedly grooved so as to form grooves 32 on the both sides of the lower magnetic pole 20. Therefore, only the insulation layers 30 are left on the both sides of the lower magnetic pole 20 except the grooves 32, and no magnetic material is left at the side of the lower magnetic pole 20. The grooves 32 will be filled with an insulating material in the following step.

By the FIB trimming, a sectional shape of the write magnetic pole, which is constituted by the upper magnetic pole 26, the write gap layer 24, the HiBs layer 22 and the lower magnetic pole 20, is formed into a trapezoid, in which width of the top part of the upper magnetic pole 26 is narrower than that of the base part of the lower magnetic pole 20. The side faces of the write magnetic pole, which includes the side faces of the upper magnetic pole 26, the lower magnetic pole 20, the write gap layer 24 and the HiBs layer 22, are smooth slope faces.

Figure 10A:
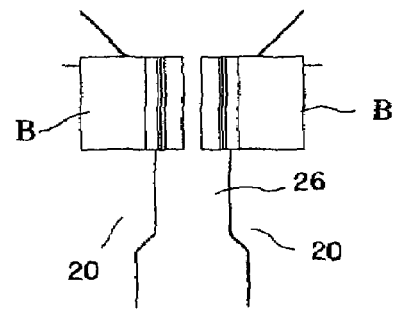
FIGS. 10A and 10B are a plan view and a sectional view showing the step of FIB trimming.
Figure 10B:
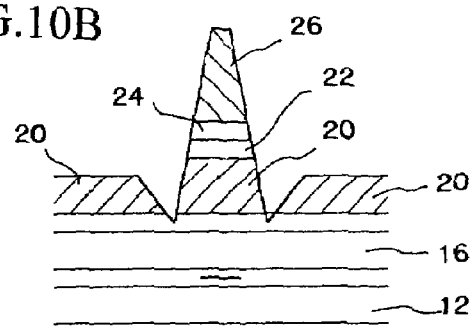

In the method of producing the thin film magnetic head of the present embodiment, the lower magnetic pole 20 of the write magnetic pole is provided under the upper magnetic pole 26 only, and no magnetic material is left at the side of the lower magnetic pole 20, so that the magnetic field leak between the upper magnetic pole 26 and the lower magnetic pole 20 can be perfectly suppressed. Therefore, the problem of lowering the write-in accuracy, which is caused by the magnetic field leak affecting a recording medium, can be solved, so that the thin film magnetic head having excellent characteristics can be produced. By comparing the constitution of the write magnetic pole shown in FIGS. 5A and 5B with that of the conventional write magnetic pole shown in FIGS. 10A and 10B, the structural differences of the both are clearly known.

In the production method of the present embodiment, when the lower magnetic pole 20 is formed on the read/write separation layer 18, the lower magnetic pole 20 is patterned according to the pattern of the upper magnetic pole 26. In the case of forming the lower magnetic pole 20 into a prescribed pattern too, disused parts of the lower magnetic pole 20 are removed in the following FIB trimming step, so the patterns of the upper magnetic pole 26 and the lower magnetic pole 20 need not be perfectly correspond and the pattern of the lower magnetic pole 20 may be slightly varied, so that the lower magnetic pole 20 can be easily made.

In the production method of the present embodiment, the steps of forming the upper magnetic pole 26, the ion mill trimming, the FIB trimming, etc. other than patterning the lower magnetic pole 20 are the same as those of the conventional method. Therefore, a conventional producing line can be used to perform the method of the present embodiment. The FIB trimming, which finally determines the shape of the write magnetic pole, may be execute to trim the side faces of the upper magnetic pole 26 and the lower magnetic pole 20 as well as the conventional method, so that the problem of lowering the productivity, which is caused by elongating time for executing FIB trimming, is not occurred.

Figure 6A:
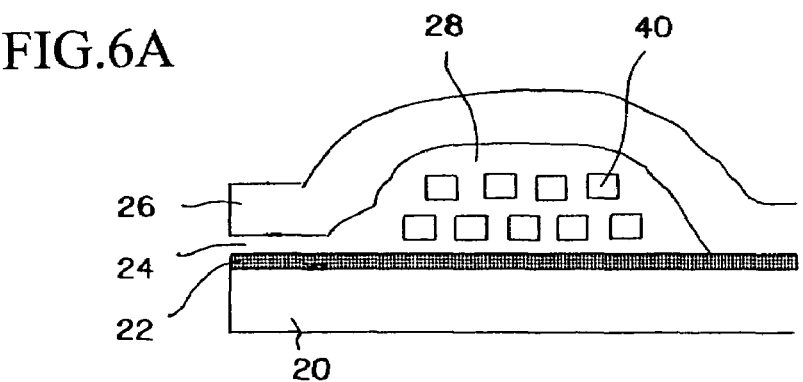
FIGS. 6A and 6B are sectional views of the thin film magnetic head.
Figure 6B:
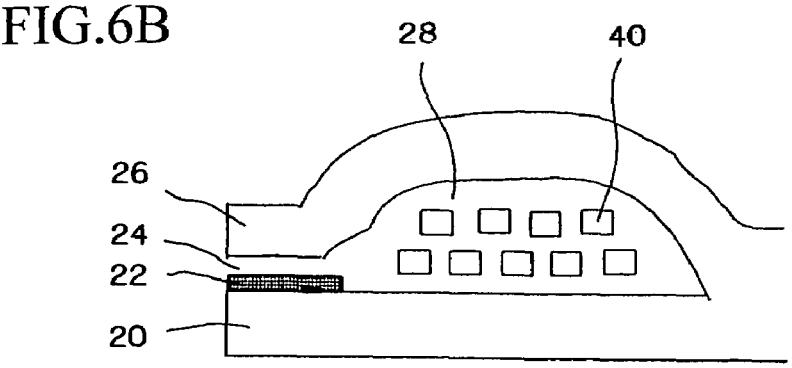

FIGS. 6A and 6B are sectional views perpendicular to the air bearing surface of the thin film magnetic head. The structure of a write head section is basically the same as that of the conventional one. In FIG. 6A, the HiBs layer 22 is formed on the whole surface of the lower magnetic pole 20; in FIG. 6B, the HiBs layer 22 is partially formed in the vicinity of the air bearing surface.

Note that, the constitution of the thin film magnetic head is not limited to the above described embodiment. For example, in the above described embodiment, the upper shielding layer 16 and the lower magnetic pole 20 are separated, but the upper shielding layer 16 and the lower magnetic pole 20 may be formed as a common layer.

EFFECTS OF THE INVENTION

In the thin film magnetic head of the present invention, as described above, the magnetic field leak between the upper magnetic pole and the lower magnetic pole can be effectively suppressed, so that the high quality thin film magnetic head having the high write-in accuracy can be provided. Further, by employing the production method of the present invention, the thin film magnetic heads can be efficiently produced without massively changing the conventional production process.

What is the claimed is:

1. A thin film magnetic head, comprising:
    a read head including a magnetoresistance effect element; and
    a write head layered on said read head, said write head having a lower magnetic pole at a base part of the write head and an upper magnetic pole at a top part of the write head, which sandwich a write gap layer,
    wherein a sectional shape of a write magnetic pole, which is constituted by the lower magnetic pole, the write gap layer and the upper magnetic pole, is formed into a trapezoid, in which the cross-sectional width of a top part of the upper magnetic pole is narrower than the cross-section width of a base part of the lower magnetic pole, and
    insulation layers, which are composed of a non-magnetic material are provided on both sides of the lower magnetic pole and cover grooves formed on both sides of the lower magnetic pole, and
    wherein only the insulation layers form the layers that are provided on both sides of the lower magnetic pole.

2. The thin film magnetic head according to claim 1, wherein a high saturation magnetic flux density (HiBs) layer is formed between the write gap layer and said lower magnetic pole.

* * * * *

UNITED STATES PATENT AND TRADEMARK OFFICE
CERTIFICATE OF CORRECTION

| | |
|---|---|
| PATENT NO. | : 7,369,359 B2 |
| APPLICATION NO. | : 10/953307 |
| DATED | : May 6, 2008 |
| INVENTOR(S) | : Mutsumi Fujita |

It is certified that error appears in the above-identified patent and that said Letters Patent is hereby corrected as shown below:

<u>On the Title Page</u>,

Item "(65) Prior Publications Data Foreign Application," insert --Continuation of Application No. PCT/JP02/03279, filed Apr. 1, 2002--.

Col. 1, line 1, after the title, insert the following:

--This is a continuation of International PCT Application No. PCT/JP02/03279 filed April 1, 2002.--.

Signed and Sealed this

Twenty-third Day of December, 2008

JON W. DUDAS
*Director of the United States Patent and Trademark Office*